United States Patent [19]

Tu et al.

[11] Patent Number: 4,882,113
[45] Date of Patent: Nov. 21, 1989

[54] HETEROGENEOUS ELASTOMERIC COMPOSITIONS CONTAINING A FLUOROELASTOMER AND PTFE AND METHODS FOR MANUFACTURING SAID COMPOSITIONS

[75] Inventors: Roger Tu, Lake Forrest; Wilfred F. Mathewson, Dana Point, both of Calif.

[73] Assignee: Baxter International Inc., Deerfield, Ill.

[21] Appl. No.: 303,520

[22] Filed: Jan. 26, 1989

[51] Int. Cl.$^4$ .......................... C08J 9/24; B29C 67/20; B29C 55/00

[52] U.S. Cl. .................... 264/127; 264/154; 264/288.8; 521/54; 521/134; 521/145; 521/919; 521/59; 525/199

[58] Field of Search ............. 521/134, 145, 54; 264/127, 154, 288.8; 525/199

[56] References Cited

U.S. PATENT DOCUMENTS

| | | | |
|---|---|---|---|
| 4,711,908 | 12/1987 | Hawrylko | 521/59 |
| 4,714,722 | 12/1987 | Najvar et al. | 521/54 |
| 4,722,945 | 2/1988 | Wood et al. | 521/54 |
| 4,746,706 | 5/1988 | Nakagawa et al. | 521/59 |

Primary Examiner—Morton Foelak
Attorney, Agent, or Firm—Michael C. Schiffer

[57] ABSTRACT

A composition comprising a homogenous mixture of unsintered porous fluoropolymer particles and fluoroelastomers, processes for manufacturing the composition, and devices made from the composition.

5 Claims, 3 Drawing Sheets

HETEROGENEOUS ELASTOMERIC COMPOSITIONS CONTAINING A FLUOROELASTOMER AND PTFE AND METHODS FOR MANUFACTURING SAID COMPOSITIONS

BACKGROUND OF THE INVENTION

This invention relates to heterogeneous compositions comprising fluoroelastomers and unsintered porous particles of polytetrafluoroethylene, and methods for manufacturing such compositions and devices made from the same.

Fluoroplastics, such as polytetrafluoroethylene ("PTFE"), are suited to a variety of uses because of their chemical inertness and desirable physical properties. Expanded fluoroplastics are characterized by a unique microporous node and fibril structure, see U.S. Pat. No. 3,953,566, Apr. 27, 1976. These expanded fluoroplastics are useful for making porous, flexible articles, including implantable prosthesis for humans and animals. Such porosity is highly desirable in devices such as vascular grafts, for example, because it promotes tissue ingrowth. The use of expanded PTFE for the fabrication of porous prosthetic implants has been somewhat problematic because of the considerable difficulty in maintaining the porosity while providing the implant with adequate strength.

Some such processes involve adding fillers to the PTFE prior to forming the prosthesis. This filler may be retained in the prosthesis, or subsequently removed by, for example, leaching it out of the formed article with a solvent to provide for the desired porosity. In either event, the use of fillers has not meet with much success. The chemical inertness of fluoroplastics, such as PTFE, although a very desirable property, is disadvantageous since many materials are not compatible or miscible with PTFE. Thus blending fillers with PTFE can be difficult. The incomplete blending of the fillers with the PTFE may cause, for example, failure of the resulting prosthesis by delamination along the contact areas between the filler and the PTFE.

Fluoropolymers possess elastomeric properties, i.e. fluoroelastomers, are also difficult to process due to their high molecular weight and melt viscosity. Elastomers, which are useful for manufacturing many types of devices because of their unique physical properties, are more easily processible by thermoplastic extrusion techniques than fluoropolymers, even fluoroelastomers which share many of the same physical properties. Fluoroelastomers, including poly-(tetrafluoroethylene-co-propylene), disclosed in U.S. Pat. No. 4,463,144, have a high molecular weight, and hence can only be extruded with difficulty. Fluoroelastomers suffer the same disadvantage associated with processing fluoropolymers in generally due to their high molecular weight and melt viscosity.

Attention has recently been concentrated on preparing fluoropolymers of copolymers of tetrafluoroethylene (TFE) and various unsaturated monomers, such as propylene. These novel fluoroelastomers take advantage of the known heat and chemical resistance of TFE, while obtaining a more easily processible polymer. Such copolymers are disclosed in U.S. Pat. No. 2,468,664 and British Patent No. 594,249.

The specific copolymers exemplified in the aforementioned patents, and the properties disclosed therein indicate that when about one-half or more of the repeating units of the copolymers are residues of tetrafluoroethylene, the resultant copolymers possess characteristics of fluoropolymers. That is, such copolymers are tough, non resilient, high melting point plastics. When the tetrafluoroethylene units do not predominate in the copolymer that the resulting copolymers are similar in properties to low melting point thermoplastic resins.

However, the above discussed fluoropolymers, and specifically fluoroelastomers, are not useful materials, in and of themselves, for preparing vascular grafts. These types of polymers do not possess the same strength, or porosity required for the preparation of vascular grafts. In this regard, none of the discussed polymers, even fluoroelastomers, when molded into a vascular graft possess the necessary porous-microstructure of pure PTFE. It would thus be desirable to have a polymer, or composition of polymers, which exhibit the desired porosity of PTFE, while also exhibiting the strength and elasticity of elastomers in general.

U.S. patent application Ser. No. 892,271, filed Aug. 4, 1986, and assigned to the assignee of this application, teaches a blend of PTFE and fluoroelastomers. The taught blend incorporates the fluoroelastomer into the PTFE matrix, with the elastomer coating the individual PTFE fibrils. This blend is used to prepare vascular grafts. Other patents teach the blending of PTFE and various fluoroelastomers, See U.S. Pat. Nos. 4,596,839, issued to Peters on June 24, 1986; 4,507,439, issued to Stewart on Mar. 26, 1985; 4,387,168, issued to Morita on June 7, 1983; 4,568,716, issued to Derencsenyi on Feb. 4, 1986 and 4,555,543, issued to Effenberger et al on Nov. 26, 1985. The compositions taught in these various reference include other additives for enhancing the compatibility between the fluoroelastomer and PTFE.

While the above discussed references provide for compositions which are a blend of the PTFE and the fluoroelastomer it remains highly desirable to form a composition of a fluoroelastomer which is loaded with PTFE. This composition would exhibit the beneficial properties of fluoroelastomers, while having the improvement of the strengthening property of PTFE.

SUMMARY OF THE INVENTION

In accordance with the present invention there is disclosed a composition which comprises an elastic, heterogeneous composition comprising a fluoroelastomer and unsintered porous particles of fluoropolymer, e.g. polytetrafluoroethylene (PTFE). The fluoroelastomer substantially saturates the matrix of the unsintered porous PTFE particles to enhance the compatibility between the two materials. The composition of the invention possesses a tensile strength of from about 1100 psi at break to about 1900 psi at break. The invention also encompasses processes for manufacturing such compositions and devices constructed from such compositions.

DESCRIPTION OF THE DRAWINGS

The present invention may be better understood and the advantages will become apparent to those skilled in the art by reference to the accompanying drawings, wherein like reference numerals refer to like elements in the several figures, and wherein.

DESCRIPTION OF THE PREFERRED EMBODIMENTS

Figure 1:
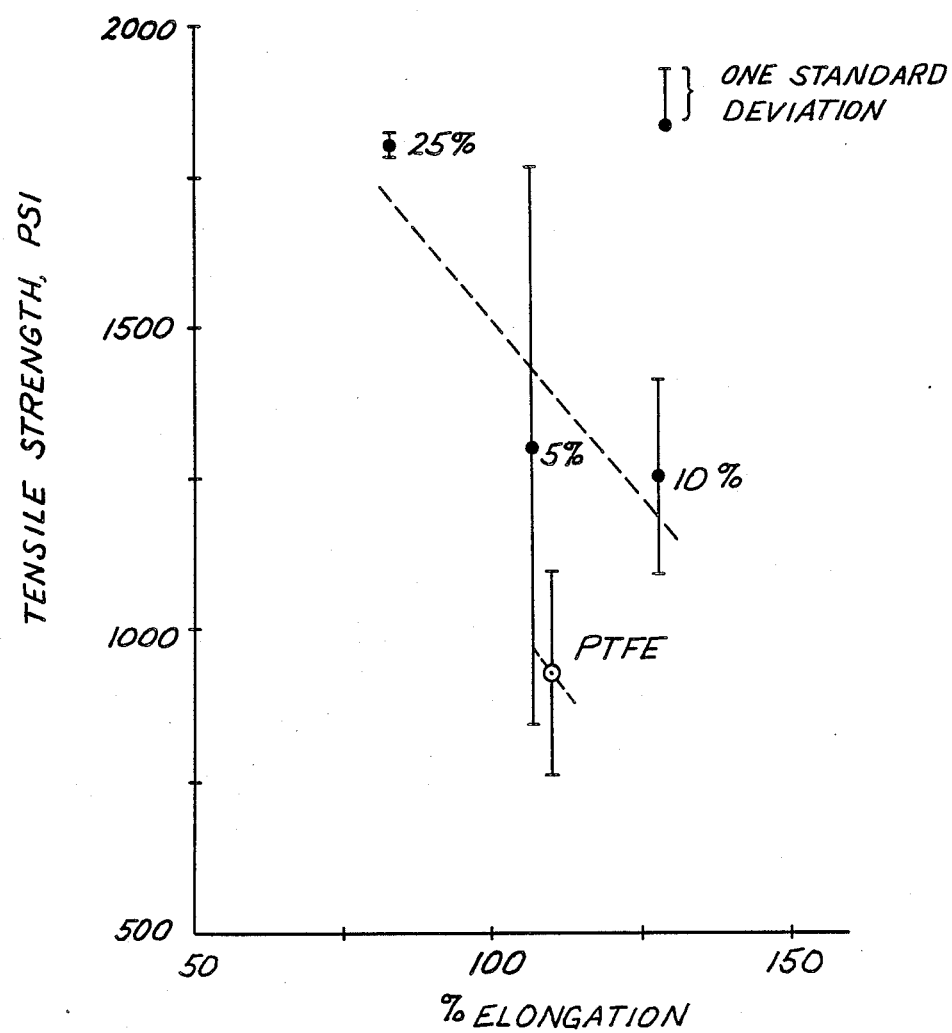
FIG. 1 is a graph indicating the relationship between tensile strength and percent elongation for a poly(tetrafluoroethylene-co-propylene)-fluoropolymer composition in accordance with a preferred embodiment of the invention having differing percent concentrations of the fluoroelastomer and the fluoropolymer.

For the purposes of describing the present invention the term "unsintered porous fluoropolymer particles" as used herein, means unsintered polymers of a general paraffinic structure which have some or all of the hydrogen atoms replaced by fluorine, including, inter alia, polytetrafluoroethylene (PTFE), fluorinated ethylene propylene (FEP) copolymer, perfluoroalkoxy (PFA) resin, homopolymers of chlorotrifluoroethylene and its copolymers with VF2 such as KEL-F, or TFE, ethylene-chloro-trifluoroethylene (ETCFE) copolymer and its modifications, ethylenetetrafluoroethylene (ETFE) copolymer and its modifications, polyvinylidene fluoride (PVDF), and polyvinylfluoride. Of these, PTFE is the preferred.

The term "fluoroelastomer," as used herein, encompasses both hydrogen-containing fluoroelastomers as well as hydrogen-free perfluoroelastomers. Fluoroelastomer is defined to mean any fluorinated polymer exhibiting elastomeric behavior or having a low flexible modulus, i.e. high compliance, and containing one or more fluorinated monomers having ethylenic unsaturation, such as vinylidene fluoride. The fluorinated monomer may be a perfluorinated mono-olefin, for example hexafluoropropylene, tetrafluoroethylene, or perfluoroalkyl vinyl ethers such as perfluoro (methyl vinyl ether) or (propyl vinyl ether). The fluorinated monomer also may be a partially fluorinated mono-olefin. The elastomer preferably comprises units derived from fluorine-containing monomers in a copolymer arrangement with other monomers which include, for example, olefins having a terminal ethylenic double bond, especially ethylene and propylene. The elastomer will normally consist of carbon, hydrogen, oxygen and fluorine atoms. Any fluoropolymer component may contain functional groups such as carboxylic or sulfonic acids and salts thereof, or a halogen as well as a reactive hydrogen on a side chain. The preferred elastomer is poly-(tetrafluoroethylene-co-propylene), a copolymer of TFE and propylene.

For the purpose of describing the present invention the terms "elastomer" shall mean any polymeric material which when in the form of a flat sheet or fiber can be stretched beyond twice its original dimension, and when released will return with force to substantially its original dimension.

The compositions of the present invention are described in detail below in connection with a preferred embodiment in which the unsintered porous fluoropolymer component is unsintered porous PTFE particles and the fluoroelastomer is poly(tetrafluoroethylene-co-propylene). The invention is described in this manner for purposes of simplicity, and such description should not be construed as limiting the scope of the invention.

As described more fully below, to make the compositions of this invention, particles of unsintered porous PTFE particles become, coated by the poly(tetrafluoroethylene-co-propylene), with the pores or matrix of the particles being substantially saturated. The poly(tetrafluoroethylene-co-propylene), in turn, is coalesced to form a singular mass about the unsintered porous fluoropolymer particles. The resulting composition can be characterized as a matrix of poly(tetrafluoroethylene-co-propylene) with interspersed unsintered porous PTFE particles substantially saturated with the poly(tetrafluoroethylene-co-propylene).

Solid sintered porous PTFE particles has a specific density of about 2.2. However, the unsintered porous PTFE particles used in this invention (such as Fluon CD-123 unsintered porous PTFE particles powders from ICI Americas, Inc.) have an apparent density of about 0.5. Therefore, the microporosity of said unsintered porous PTFE particles powder is 77% void. This greater void becomes filled with the fluoroelastomer in accordance with the invention.

It has been determined that the compatibility between the unsintered porous PTFE particles and the fluoroelastomer is such so as to provide for a more "homogenous" mixture. By "homogenous" it is meant that upon visual observation of a 3000X micrograph of a composition in accordance with the invention, the fluoroelastomer matrix and the unsintered porous fluoropolymer particles, appear as a single continuous phase. This is believed to be the result of the chemical compatibility between the unsintered porous fluoropolymer particles and the fluoroelastomer, in combination with the partial filling of the pore structure of the particles. This homogenous structure substantially reduces any potential of failure of the composition due to delamination. It has been found that the this homogenous state is achieved when the porous PTFE particles are in an unsintered state, not when the particles have been sintered.

Figure 3:
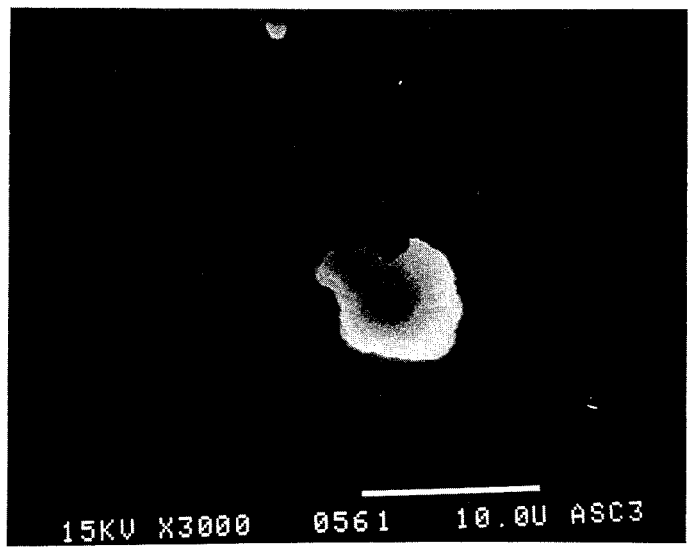
FIG. 3 is a scanning electron microscopy picture of a composition of a fluoroelastomer, Aflas ®, and sintered PTFE particles.
Figure 4:
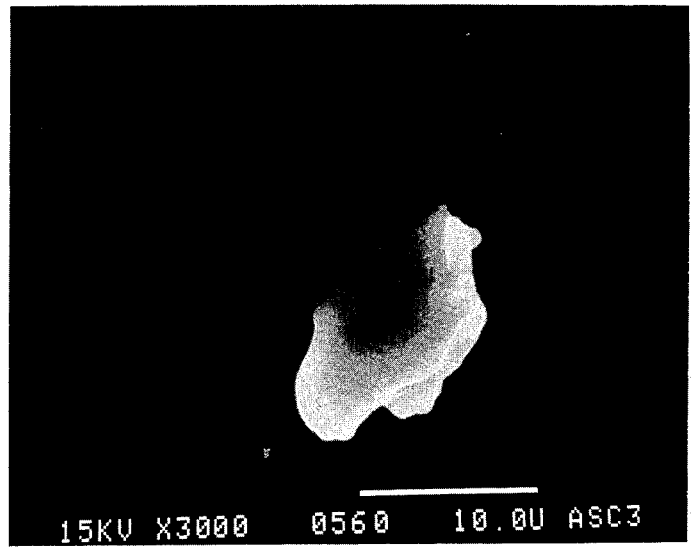
FIG. 4 is a scanning electron microscopy picture of a composition of a fluoroelastomer, Aflas ®, and unsintered PTFE particles.

This "homogenous" mixture is better illustrated with reference to FIGS. 3 and 4. FIG. 3 is a 3000X micrograph of a composition of a fluoroelastomer and sintered PTFE, while FIG. 4 is a 3000X micrograph of a composition in accordance with the invention. As seen in FIG. 3 the delineation between the PTFE particule and the fluoroelastomer is apparent, as seen as a clean boundary area between the particule which is dark and the fluoroelastomer which is white. In FIG. 4 the delineation between the particle, dark area, and the fluoroelastomer, white, is not as clean. This demonstrates the greater compatibility between unsintered PTFE and fluoroelastomers.

Figure 2:
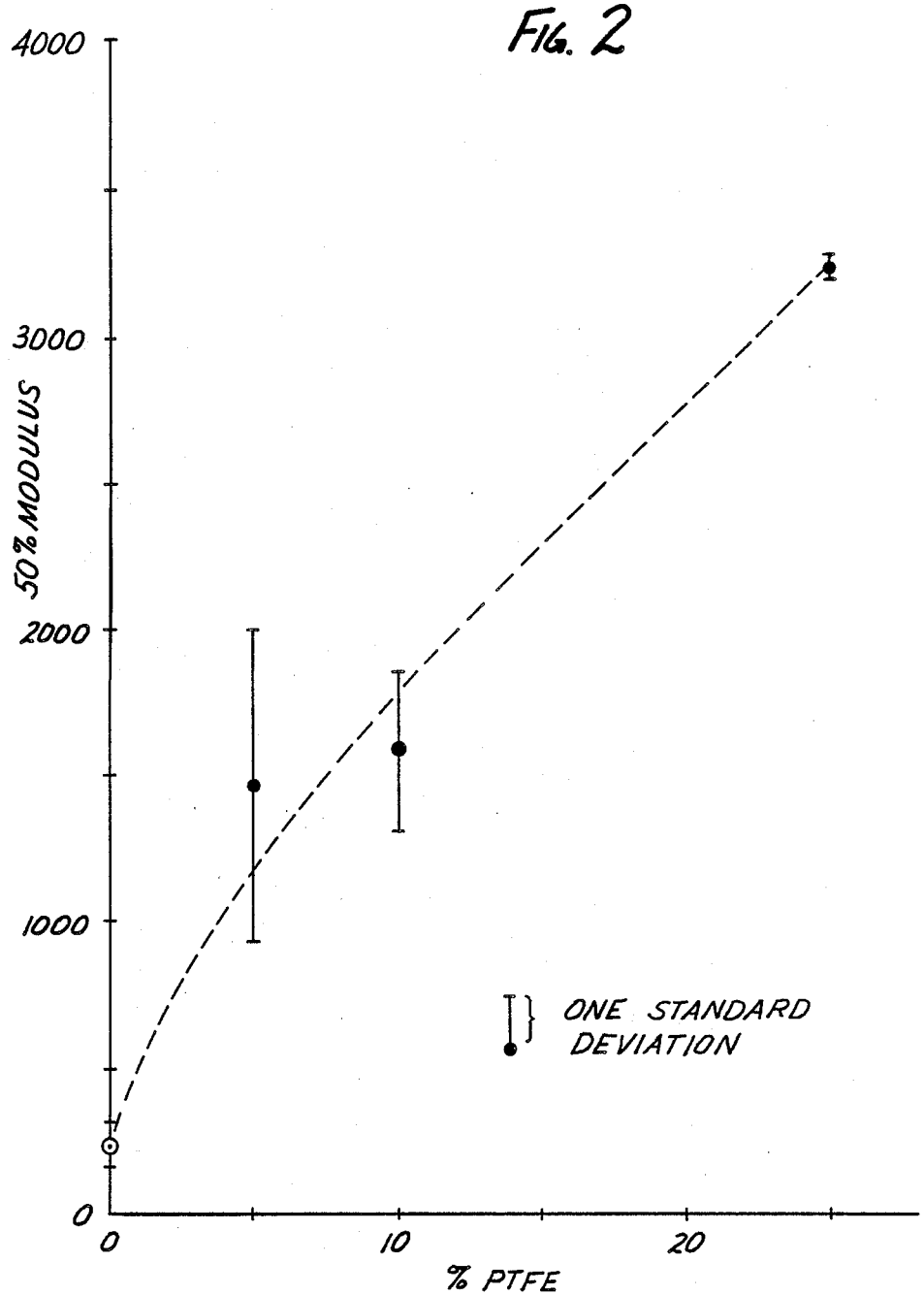
FIG. 2 is a graph indicating the relationship between 50% Modulus and the weight percent of the fluoropolymer in a composition in accordance with the invention.

The percentage of unsintered porous PTFE particles can be varied, depending upon the properties desired in the end product. FIG. 1 is a graph illustrating the effect on tensile strength and elasticity of different concentrations of the unsintered porous fluoropolymer particles in compositions of the invention. In particular, as TFE is added, the tensile strength of the composition increases, while its elasticity decreases. Generally, these compositions will have a tensile strength, at the breaking point, of from about 1100 psi to about 1900 psi. FIG. 2 is a graph showing the relationship between tensile modulus and the concentration of unsintered porous PTFE particles in the compositions.

In general, the modulus increases as the concentration of the unsintered porous PTFE particles in the composition increases. The weight-to-weight ratio will ordinarily vary from about 1:99 to about 7:3 parts unsintered porous PTFE particles to parts poly(tetrafluoroethylene-co-propylene). The preferred ratio range is from about 1:20 to about 1:3. Such a ratio preserves the typical-unsintered porous PTFE particles-fibril-nodal-microstructure and maintains an elasticity of more than 50% elongation. A "typical-unsintered porous PTFE particles-fibril-nodal microstructure" is defined as the microporosity generated by expansion of premixed, compression molded and/or extruded unsintered porous PTFE particles (e.g., paste extruded articles). In general, a composition with a weight to weight ratio of unsintered porous PTFE particles to poly(tetrafluoroethylene-co-propylene) of 1:3 is expanded to have a microporosity of about 26%.

A variety of methods of mixing the unsintered porous fluoropolymer particles into the poly(tetrafluoroethylene-co-propylene) are suitable, so long as the fluoroelastomer substantially coats, and substantially saturates the unsintered porous fluoropolymer particles to provide for the desired homogenous mixture. In one method, aqueous dispersions of poly(tetrafluoroethylene-co-propylene) and unsintered porous PTFE particles are mixed, and the particles are coagulated by addition of acetone or a lower aliphatic alcohol. Coagulation of the particles may also be achieved by spraying the aqueous dispersion mixture into an acetone or alcohol vapor. The particles are then filtered and dried. Alternatively, the unsintered porous PTFE particles and poly(tetrafluoroethylene-co-propylene) may be powdered and mixed. The latter procedure may be conducted cryogenically.

Prior to compression molding or otherwise forming the unsintered porous PTFE particles-poly(tetrafluoroethylene-co-propylene) mixture, a lubricant is advantageously added to the particles to yield a moldable or extrudable paste. Lubricants used in paste forming of fluoropolymers are well-known. Examples of such lubricants include liquid hydrocarbons, such as solvent naphtha, mineral spirits, white oil, etc., aromatic hydrocarbons, such as toluene, xylene, etc., alcohols, glycols, esters, silicone oil, fluorocarbon oil and surfactant-containing water.

One example of the use of a lubricated unsintered porous PTFE particles/poly(tetrafluoroethylene-co-propylene) powder mixture in accordance with this invention is the preparation of a tubular vascular graft. The lubricated unsintered porous PTFE particles-poly(tetrafluoroethylene-co-propylene) powder mixture is first preformed into a cylindrical billet by compression molding. The preformed billet is then extruded in a ram extruder to form a tubular extrudate. The resultant extrudate is then stretched in an oven at a temperature between room temperature and about 370° C., which is the sintering temperature of the unsintered porous PTFE particles. A stretching rate of about 10% per second is advantageously employed. Stretching may continue until a length of about 105% to 400% of the original length has been obtained. Finally the stretched tubing is sintered at about 370° C. for about 3 to 5 minutes.

The resultant product is useful in biomedical applications as vascular grafts or in industrial applications. Vascular grafts typically require a degree of porosity about the exterior surface area. This may be provided by wrapping the outer surface with a filament, either and elastomer or nonelastomeric filament may be used, a sufficient number of times to provide for the desired porosity. Other methods include coating the resulting graft with a material which can be made porous by known techniques.

In any of the pressing methods, an additional desired step is to coagulate the poly(tetrafluoroethylene-co-propylene) unsintered porous PTFE particles mixture to form a matrix. This step can be effected by treating the poly(tetrafluoroethylene-co-propylene)-unsintered porous PTFE particles mixture with acetone, ethanol or other alcohols. The coagulation step may take place at any time during the mixing of the poly(tetrafluoroethylene-co-propylene) and unsintered porous PTFE particles or during any subsequent processing of the resultant composition.

In an alternative embodiment, the compositions of this invention can be formed into sheet products, which in turn, may be used to fabricate prosthetic articles, such as heart valves, membranes, and the like. One example of a method for preparing such a sheet product is as follows. The composition of this invention can be formed by roll milling the poly(tetrafluoroethylene-co-propylene) and unsintered porous PTFE particles together using any conventional type of roll mill known to those skilled in the art. A predetermined percentage by weight of powdered unsintered porous PTFE particles is mixed into a mill containing poly(tetrafluoroethylene-co-propylene) for roll-mixing.

In this embodiment, the lubricant may be omitted. A separate coagulation step also is not necessary because the poly(tetrafluoroethylene-co-propylene) and unsintered porous PTFE particles are coagulated as an inherent step of the roll-milling process. The resulting composition is then sheet extruded by conventional techniques, such as rolling between two heated steel rolls. The extrusion process results in expansion of the polymer into the conventional node and fibril microstructure. Sintering may be accomplished during the extrusion process or by subsequently passing the extrudate through an oven or over heated rolls.

Optionally, the composition resulting from any of the foregoing processes may be cured further by treatment with steam or heat processing.

The resultant novel compositions have numerous industrial and medical applications. For example, their elasticity makes them suitable to be formed into medical devices, such as certain types of prostheses, which are designed to undergo cyclical stress. Thus, without limiting the scope of the invention, applications of the compositions in devices such as vascular grafts, heart valves, or artificial ligaments are contemplated. Additionally, the compositions may be used for the fabrication of devices used in fluid transport, such as catheters. Non-limiting examples of non-medical devices which lend themselves to this invention include flexible toys, gaskets, lawn chairs, fan belts, hoses, filters, membranes, flexible joints, valve seals, diaphragm, lining, O-ring and shaft sealing.

The present invention is further described in the following examples, which are provided for illustrative purposes only and are not to be construed as limiting.

EXAMPLE 1

Three pounds of poly(tetrafluoroethylene-co-propylene) 150P dried gum elastomer (AFLAS,) from Asahi Glass Co., were fed through a twin-mill for roll mixing. The rolls were 6 inches in diameter and rotated at about 30 rpm. One pound of Fluon CD-123 unsintered porous PTFE particles powder from ICI Americas, was gradually added to the milling poly(tetrafluoroethylene-copropylene) until uniformly dispersed. The final poly(tetrafluoroethylene-co-propylene)-unsintered porous PTFE particles composition appeared to be well mixed and comprised 75% poly(tetrafluoroethylene-co-propylene) and 25% unsintered porous PTFE particles, on a weight basis. This composition was extruded into a sheets by rolling it between the rolls of the roll mills. The pressure between the rolls was set to achieve a sheet thicknesses averaging from about 0.110 to about 0.125 inches. This composition was labelled Compound D.

EXAMPLE 2

Extruded sheets prepared from a composition containing 90% poly(tetrafluorethylene-co-propylene) and 10% unsintered porous PTFE particles were made according to the method of Example 1. These compositions were labelled Compound C.

EXAMPLE 3

Extruded sheets prepared from a composition containing 95% poly(tetrafluoroethylene-co-propylene) and 5% unsintered porous PTFE particles were made according to the method of Example 1. These compositions were labelled Compound B.

EXAMPLE 4

The strength and elasticity of the compositions of Examples 1-3 were compared, against each other and against a control, labelled Compound A, consisting of 100 percent poly(tetrafluoroethylene-co-propylene) which was roll milled and extruded using the conditions set forth in Example 1. ASTM standard dog-bone shape samples were prepared from all four rolls. Specimens were cut parallel with and perpendicular to the direction of extrusion. The specimens were clamped at both ends within an Instron tensile strength tester, a machine known in the art. The cross-sectional area of the clamp onto the specimen was measured. The specimen started to move away at a predetermined rate. A stress-strain curve was generated on a chart recorder until the specimen broke. Results are provided in Table 1.

TABLE 1

| Compound No. | Tensile Strength @ Break, psi | % Elongation @ Break | Modulus @ 50% E* psi |
|---|---|---|---|
| A | 929 | 110 | 240 |
| B | 1306 | 107 | 1464 |
| C | 1257 | 128 | 1575 |
| D | 1808 | 83 | 3238 |

*Modulus @ 50% is the modulus measured at 50% elongation from the sample's original length.

These results indicate that as the amount of unsintered porous PTFE particles is added to poly(tetrafluoroethylene-co-propylene) increases, the tensile strength of the composition increases. The amount of force needed to permanently deform the material also increases substantially as the amount of unsintered porous PTFE particles in the composition is increased.

EXAMPLE 5

The anhysterisis of the composition of Example 2 was compared to the anhysterisis of the control of Example 4. Samples were subjected to a 10% strain on an extensometer and returned to 0% strain. This process was repeated 10 times. Results are given in Table 2.

TABLE 2

| Compound No. | Cycle # | Stress, psi | Stress standard deviation, psi |
|---|---|---|---|
| A | 10 | 32 | 2 |
| C | 10 | 94 | 6 |

It was also observe that after 10 cycles Compound C showed a stress with comparable standard deviation, as the control.

EXAMPLE 6

Poly(tetrafluoroethylene-co-propylene) was compounded with MT Black No. N990, a carbon black supplied by Xenox Inc., at varying concentrations. Strength and elasticity measurements were performed in accordance with the method of Example 4. Results are given in Table 3.

TABLE 3

| Sample # | % MT Black* | Tensile Strength @ Break, psi | % Elongation at Break | Modulus @ 50% E psi |
|---|---|---|---|---|
| 1 | 5 | 2100 | 250 | 600 |
| 2 | 20 | 2520 | 160 | 1280 |
| 3 | 33 | 2420 | 150 | 2050 |
| 4 | 44 | 2370 | 70 | 3680 |

*The composition was based on the final test specimens.

These parameters are compared with the parameters given in Table 1. As was shown in Table 1, a composition of poly(tetrafluoroethylene-co-propylene) and 5% unsintered porous PTFE particles showed a Modulus @ 50% E of 1464 psi. Table 3 shows that the composition of poly(tetrafluoroethylene-co-propylene) and 5% MT Black showed a Modulus @ 50% E of only 600 psi. Furthermore, the modulus @ 50% E for the composition of 75% poly(tetrafluoroethylene-co-propylene) and 25% unsintered porous PTFE particles (i.e., 3238 psi) is even higher than that for the composition of poly(tetrafluoroethylene-co-propylene) and 33% MT Black (i.e., 2050 psi).

The results indicate that unsintered porous fluoropolymer particles-fluoroelastomers compositions have superior strength and exhibit for greater resistance to permanent deformation than poly(tetrafluoroethylene-co-propylene)-carbon black compositions of comparable proportions.

While the preferred embodiments have been described, various modifications and substitutions may be made thereto without departing from the scope of the invention. Accordingly, it is to be understood that the invention has been described by way of illustration and not limitation.

What is claimed is:

1. A process for manufacturing an article from a heterogeneous composition of unsintered porous polytetrafluoroethylene (PTFE) particles and a fluoroelastomer, comprising:
    (a) mixing particulate unsintered porous PTFE particles and fluoroelastomer to form a heterogenous mixture wherein the unsintered porous PTFE particles have become substantially saturated with the tetrafluoroethylene/propylene copolymer fluoroelastomer;
    (b) forming the article from the heterogenous mixture.

2. The process of claim 1 further including the steps of:

(a) mixing said mixture with a liquid lubricant to form a paste;
(b) compression molding the paste into a billet;
(c) extruding the billet into an extrudate;
(d) stretching the extrudate at an elevated temperature at a rate of at least about 10% per second to form an expanded article; and
(e) sintering the expanded article at an elevated sintering temperature.

3. The process of claim 1, wherein the PTFE particles have an average diameter of about 50 to about 1000 microns.

4. The process of claim 1, wherein the ratio of unsintered porous PTFE particles to fluoroelastomer ranges from about 7:3 to about 1:99 on a weight to weight basis.

5. The process of claim 1, wherein the ratio of unsintered porous PTFE particles to fluoroelastomer ranges from about 1:3 to about 1:20 on a weight to weight basis.

* * * * *